No. 792,861. PATENTED JUNE 20, 1905.
H. C. SWAN.
FIFTH WHEEL.
APPLICATION FILED NOV. 19, 1904.

2 SHEETS—SHEET 1.

WITNESSES
INVENTOR

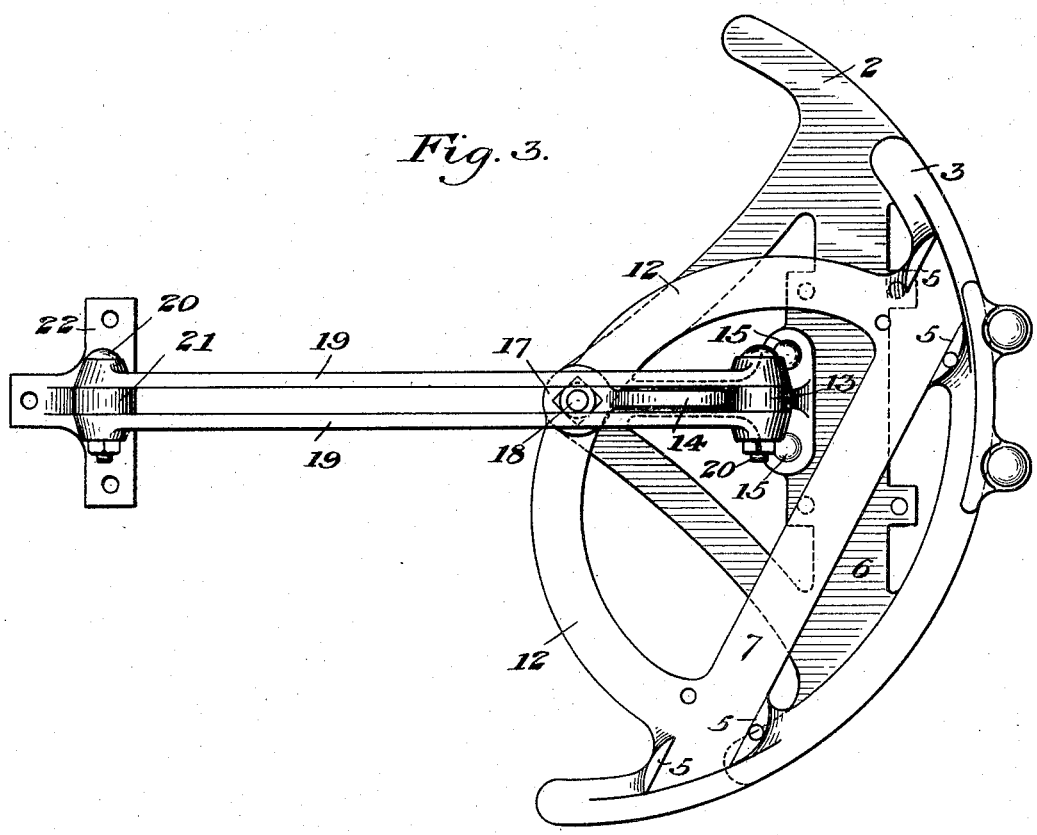

No. 792,861. Patented June 20, 1905.

UNITED STATES PATENT OFFICE.

HENRY C. SWAN, OF CLEVELAND, OHIO.

FIFTH-WHEEL.

SPECIFICATION forming part of Letters Patent No. 792,861, dated June 20, 1905.

Application filed November 19, 1904. Serial No. 233,424.

*To all whom it may concern:*

Be it known that I, HENRY C. SWAN, of Cleveland, Cuyahoga county, Ohio, have invented a new and useful Fifth-Wheel, of which the following is a full, clear, and exact description, reference being had to the accompanying drawings, forming part of this specification, in which—

Figure 1:
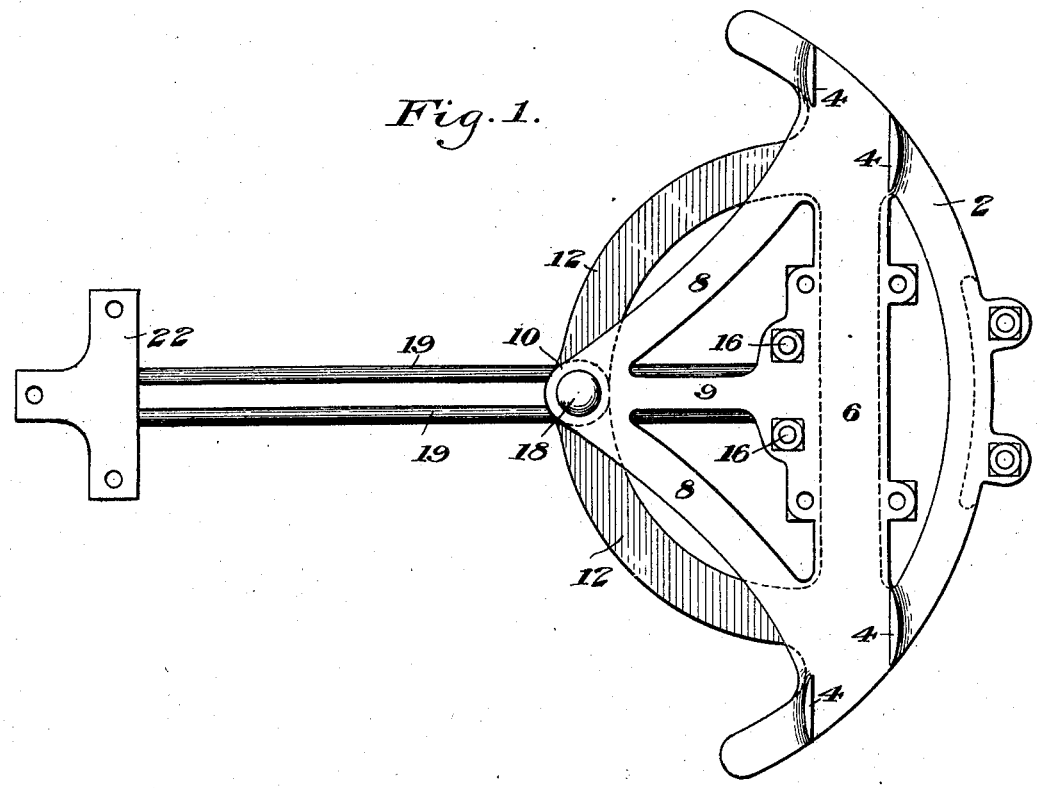
Figure 2:
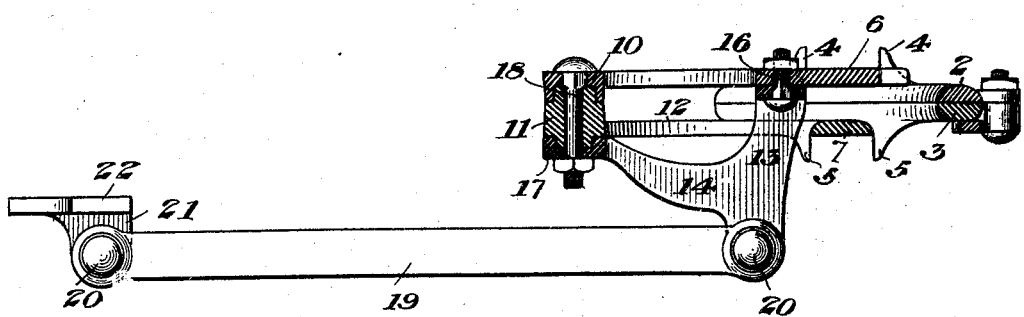

Figure 1 is a top plan view of my improved fifth-wheel. Fig. 2 is a sectional side elevation of the same, and Fig. 3 is a bottom plan view.

My invention relates to the class of fifth-wheels, more particularly those used on vehicles having no perch.

The object of the invention is to provide a simple, strong, and efficient construction of fifth-wheel for this type of vehicle.

In the drawings, 2 represents the upper circle-plate, and 3 the lower circle-plate, these being shown as in the form of arcs, with pairs of lugs 4 and 5 to receive the axle and axle-bed in the ordinary manner.

I have shown the fifth-wheel members as provided with cross-bars 6 and 7, the upper circle having brace-arms 8 and 9, extending back to the socket 10. This socket has a cylindrical recess with a squared hole leading into it, so as to fit upon the reduced shoulder portion of the hub 11 at the ends of the arms 12 on the lower circle.

Secured to the upper-circle-plate frame is a vertically-extending stay-brace, which I have shown as having the arms 13 and 14, the arm 13 having lugs 15, which are secured to the upper circle by the bolts 16. This stay-brace is preferably cast in one integral piece, and the arm 14 has a socket 17, which fits the lower reduced shoulder of the hub 11. The king-bolt 18 extends through the sockets 10 and 17 and through the hub 11, this hub turning freely within the sockets.

To the lower end of the stay-brace is pivoted a connected link or brace, which I have shown as consisting of two link members 19, having the bolt 20 extending through their ends and through the lower lug of the brace. The other ends of these links extend over and are pivoted to a lug 21 on a bracket 22, which may be secured to the body of the vehicle or a projection thereon.

The advantages of my invention result from the use of the stay-brace, which is connected to the upper circle-plate or top fifth-wheel member and is connected by the pivotal link or brace to the body. A strong and simple construction is thus afforded which gives easy action.

Many variations may be made in the form and arrangement of the circle-plates or fifth-wheel members, the stay-brace, and the other parts without departing from my invention.

I claim—

1. In a fifth-wheel having upper and lower fifth-wheel members, a bracket having one portion secured to the upper fifth-wheel member and another portion secured to the pivotal center of the fifth-wheel, and a stay or brace pivoted to said bracket and arranged to be pivoted to the vehicle-body to allow a free vertical movement of said body; substantially as described.

2. In a fifth-wheel having upper and lower fifth-wheel members, a bracket secured to the upper circle member and the king-bolt center, and projecting below the lower circle member, and a pivotal stay or brace arranged to connect the bracket and the vehicle-body; substantially as described.

3. In a fifth-wheel, the combination with a top circle-plate of an open lower circle-plate, a bracket secured to the upper circle member and projecting through the lower circle member, said bracket having a socket for the king-bolt, and a pivotal link arranged to connect the bracket and the body of the vehicle; substantially as described.

4. In a fifth-wheel, an upper circle-plate having a rear socket, a bracket projecting downwardly therefrom below the lower circle and having a rear socket, a lower circle-plate having a hub between the sockets, a king-bolt extending through the sockets and hub, and a pivotal link arranged to connect the bracket with the body; substantially as described.

In testimony whereof I have hereunto set my hand.

HENRY C. SWAN.

Witnesses:
ERICH W. KATH,
EMIL W. JAITE.